United States Patent

[11] 3,622,648

| [72] | Inventors | Karl Schloemer<br>Ludwigshafen am Rhine;<br>Hugo Kroeper, Heidelberg; Hans-Martin<br>Weitz, Frankenthal Upper Palatinate, all of<br>Germany |
|------|-----------|---|
| [21] | Appl. No. | 729,987 |
| [22] | Filed | May 17, 1968 |
| [45] | Patented | Nov. 23, 1971 |
| [73] | Assignee | Badische Anilin- & Soda-Fabrik<br>Aktiengesellschaft<br>Ludwigshafen am Rhine, Germany |
| [32] | Priority | May 27, 1967 |
| [33] |  | Germany |
| [31] |  | P 16 18 168.3 |

[54] DIMERIZATION OF OLEFINS
9 Claims, 1 Drawing Fig.

[52] U.S. Cl. .................................................. 260/683.15E,
252/430
[51] Int. Cl. ..................................................... C07c 3/20
[50] Field of Search ........................................... 260/683.15
D, 683.15 E

[56] References Cited
UNITED STATES PATENTS

| 2,781,410 | 2/1957 | Ziegler et al.......... | 260/683.15 |
|---|---|---|---|
| 3,243,467 | 3/1966 | Zuech ........................... | 260/683.15 X |
| 3,483,268 | 12/1969 | Hambling et al............... | 260/683.15 |
| 2,969,408 | 1/1961 | Nowlin et al................... | 260/683.15 |
| 2,994,725 | 8/1961 | Shaw et al...................... | 260/683.15 |
| 3,053,916 | 9/1962 | Wilson et al. .................. | 260/683.15 |
| 3,075,027 | 1/1963 | Bittner et al.................... | 260/683.15 |
| 3,217,050 | 11/1965 | Schriesheim et al........... | 260/683.15 X |
| 3,251,895 | 5/1966 | Wilkes............................ | 260/683.15 X |
| 3,431,318 | 3/1969 | McClure ........................ | 260/683.15 |

OTHER REFERENCES

Hackh's Chemical Dictionary, pub. by McGraw-Hill, New York, 4th Ed., (1969), page 421 relied on.

*Primary Examiner*—Paul M. Coughlan, Jr.
*Attorney*—Johnston, Root, O'Keefe, Keil, Thompson & Shurtleff ABSTRACT: An improved process for the dimerization of olefins in the presence of alkali metal catalysts at 60° to 200° C. and at atmospheric pressure up to 300 atmospheres, catalysts being used which have been derived from an alkali metal and an organic compound containing one or more than one carbonyl group. The process is particularly suitable for effective and selective dimerization of propylene to 4-methylpenetene-1. Some of the dimers obtained are suitable as antiknock additives and for the production of polymers.

PATENTED NOV 23 1971
3,622,648
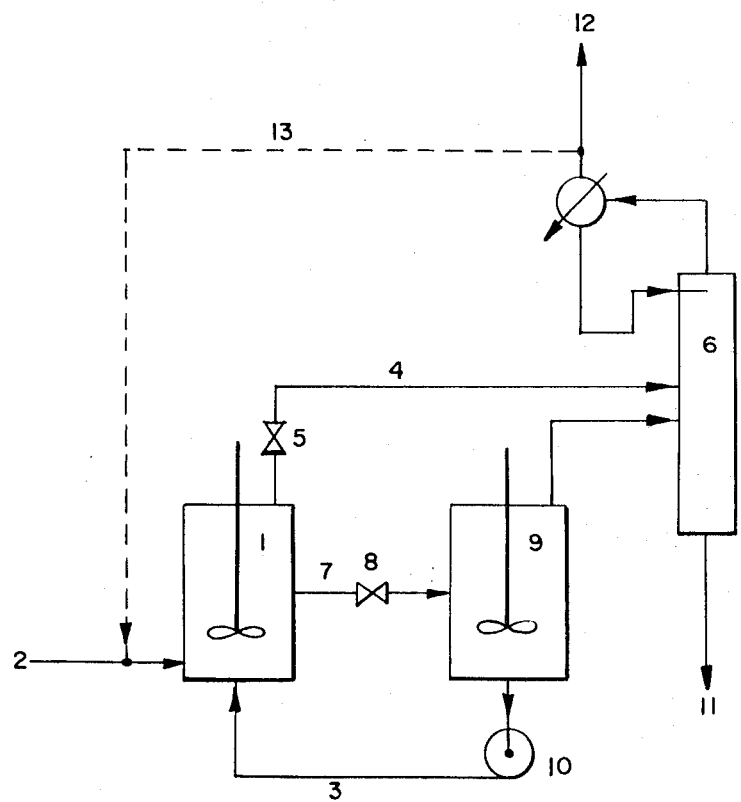
INVENTORS:
KARL SCHLOEMER
HUGO KROEPER
HANS-MARTIN WEITZ
BY: Marzall, Johnston, Cook & Root
ATT'YS

DIMERIZATION OF OLEFINS

This invention relates to an improved process for the dimerization of olefins by means of alkali metal catalysts.

It is known that olefins can be reacted in the presence of alkali metals to form oligomers. Considerable attention has been given to the alkali metal catalyzed dimerization of propylene into 4-methylpentene-(1) because among the possible isomers of dimerized propylene 4-methylpentene-(1) has found special interest as an antiknock additive. In particular however 4-methylpentene-(1) is in demand for the production of high melting point isotactic polymers which can be processed for example into fibers and films.

A process for the dimerization of propylene is described in U.S. Pat. No. 2,986,588 in which potassium is used as catalyst. The rate of reaction in this process is low however and the reaction product contains considerable amounts of undesired isomers in addition to the 4-methylpentene-(1). The use of alkali metal catalysts applied to carbon for the dimerization of olefins is described in U.S. Pat. No. 2,881,234. In the dimerization of propylene in the presence of these catalysts, a mixture of isomers is obtained which contains 2-methylpentene-(2) as the main component. A mixture of an alkali metal with iron powder is recommended as a catalyst for the dimerization of olefins in U.S. Pat. No. 2,994,725. The yield of 4-methylpentene-(1) in the dimerization of propylene is unsatisfactory.

It is an object of this invention to provide an improved process for the dimerization of olefins in which the olefins are dimerized at a higher speed and higher rates of conversion than in prior art methods. Another object of the invention is to provide a process for the dimerization of propylene which gives more or less exclusively the desired 4-methylpentene-(1).

In accordance with this invention these and other objects and advantages are achieved in an improved process for the dimerization of olefins in the presence of alkali metal catalysts at temperatures of from 60° to 200° and at pressures of from atmospheric pressure to 300 atmospheres in which the improvement comprises using a catalyst derived from an alkali metal and an organic compound containing one or more than one carbonyl group.

Linear and branched olefins, advantageously olefins having three to eight carbon atoms, are dimerized by the process according to this invention. Examples of olefins which may be used are: heptene-(1), butene-(1), butene-(2), isobutylene, pentene-(1), hexene-(1), octene-(1) and particularly propylene. Products which are of industrial interest are mainly obtained by reaction of linear α olefins.

The improvements over the prior art methods are achieved by the use of a catalyst derived from an alkali metal and an organic compound containing one or more than one carbonyl group. Lithium, sodium, potassium, rubidium or caesium or mixtures of these metals may be used as alkali metals. It is preferred to use potassium on account of its high activity. Since the alkali metals (with the exception of lithium) are molten under the reaction conditions used, they may be placed in the reactor in any form, for example as strips or rods. To achieve satisfactory conversion it is advantageous to use the alkali metal in a finely dispersed form.

Preferred organic compounds containing carbonyl groups contain one to four carbonyl groups. Examples are carboxylic esters, dicarboxylic esters, ketocarboxylic esters, aldehydes and particularly aliphatic, aliphatic-aromatic and aromatic ketones and diketones. They may have two to 20, particularly two to 15, carbon atoms and apart from the carbonyl groups may have hydrocarbon structure or contain inert groups such as alkoxy groups. Examples of suitable compounds are ethyl acetate, diethyl malonate, diethyl 1,4-cyclohexanedione-2,5-dicarboxylate, acetaldehyde, butyraldehyde, stearaldehyde, acetone, acetophenone, benzophenone, benzylacetone, acetylacetone, acetonylacetone, benzoylacetone and cyclohexanone. It is however particularly advantageous to use chelate complexes of β-dicarbonyl compounds and heavy metals, for example nickel(II) acetyl acetonate, cobalt(III) acetyl acetonate and nickel(III) benzoyl acetonate. The molar ratio of organic compound containing carbonyl groups to alkali metal may be chosen at will; in general it is from 0.001:1 to 0.5:1, preferably 0.005:1 to 0.1:1. The organic compound containing carbonyl groups and the alkali metal may be used as such or supported on inert carrier materials.

The process of the invention may be carried out at temperatures of from 60° to 200° C., particularly from 100° to 150° C. Atmospheric pressure may be used. To achieve a high conversion however it is advantageous to use pressures from 10 to 300, preferably from 30 to 80, atmospheres.

The reaction is advantageously carried out in a pressure reactor which contains the catalyst and into which the olefin to be dimerized is passed. It is possible to dispense with the use of solvent. It is advantageous however to carry out the reaction in an organic solvent which is inert under the reaction conditions. Saturated aliphatic hydrocarbons such as hexane, heptane, octane, nonane, decane, isooctane, decahydronaphthalene, cycloheptane or mixtures of saturated aliphatic hydrocarbons such as kerosene, paraffin oil or a mineral oil are particularly suitable as inert organic solvents. It is advantageous to use a solvent whose boiling point or boiling range differs markedly from the boiling point of the reaction product, so that separation of the reaction product from the reaction mixture is facilitated. The solvent and catalyst are usually used in a ratio of 80 to 99 percent by weight of solvent to 20 to 1 percent by weight of catalyst.

The reaction period may be in general from 1 to 8 hours depending on the reaction conditions.

The process of this invention may be carried out as follows: The alkali metal and the organic compound containing carbonyl groups are introduced into a pressure vessel which contains for example paraffin oil. The starting material is then passed in and the mixture is brought to the reaction temperature which is advantageously maintained until the end of the reaction can be recognized by a drop in pressure. The reaction product is separated from the reaction mixture, any unconverted starting material being returned. The suspension of catalyst in solvent which remains after the separation may be used repeatedly for the reaction without replenishing the catalyst. It is advantageous however to carry out the process continuously, for example by continuously withdrawing the dimer and maintaining the pressure in the reactor constant by continuous supply of olefin. Starting material withdrawn with the dimer is separated and returned to the reactor. A continuous process is described in example 20 (below).

The invention is illustrated by the following examples.

EXAMPLE 1

A suspension of 0.5 gram-atom of potassium and 0.005 mole of nickel acetyl acetonate in 600 g. of paraffin oil is charged into an autoclave provided with a stirrer. 8 moles of propylene is forced in and the whole is heated rapidly to 140° C., the pressure rising to 70 atmospheres. After four hours at 140° C., the pressure has fallen to 30 to 40 atmospheres. The reactor is released from pressure and the reaction product is isolated and analyzed. The reaction is repeated several times using the suspension of catalyst in paraffin oil remaining in the autoclave. Investigation of the reaction product in the first three reactions gives the results shown in table 1.

TABLE 1

| reaction | 1 | 2 | 3 |
|---|---|---|---|
| reaction temperature in °C. | 140 | 140 | 140 |
| duration of reaction in hours | 4 | 4 | 4 |
| moles of propylene supplied | 8 | 8 | 8 |
| moles of hexene product | 1.99 | 1.34 | 1.72 |
| composition of hexene product in % by weight: | | | |
| 4-methylpentene-1 | 82.5 | 79.6 | 81.2 |
| 4-methylpentene-2 | 7.9 | 11.6 | 9.6 |
| 2-methylpentene-1 | 2.3 | 1.9 | 1.8 |
| 2-methylpentene-2 | 1.0 | 1.5 | 1.1 |

EXAMPLES 2 to 16

In examples 2 to 14, catalysts according to this invention are used, while in examples 15 and 16 potassium is used by itself as the catalyst. The examples are set out in tabular form in table 2 in which the following abbreviations are used:

Ex = Example No.
K = amount of potassium in moles
A = activator used
Q = quantity, in moles, of activator
P = amount of propylene in moles
T = temperature in °C.
D = duration of the reaction in hours
M = maximum pressure in atmospheres gauge
C = conversion of propylene in %
H = hexene yield in % of the theory with reference to propylene reacted (some of the propylene polymerizes into higher oligomers and some is hydrogenated into propyne)

a = 4-methylpentene-1
b = 4-methylpentene-2
c = 2-methylpentene-1
d = 2-methylpentene-2
} Making up the percentage composition of the hexene mixture e = other products making up the percentage composition of the hexene mixture
NAA = nickel(II) acetylacetonate
CAA = cobalt(III) acetylacetonate
AA = acetylacetone
ACA = acetonylacetone
A = acetone
ADH = acetaldehyde
TBP = tert-butyl propionate

TABLE 2

| Ex | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|
| K | 0.5 | 0.5 | 0.5 | 0.5 | 0.25 | 0.25 | 0.25 | 0.25 | 0.5 | 0.5 | 0.5 | 0.5 | 0.5 | 0.5 | 0.5 |
| A | NAA | NAA | NAA | NAA | NAA | NAA | CAA | AA | AA | ACA | A | ADH | TBP | | |
| Q | 0.005 | 0.02 | 0.02 | 0.005 | 0.005 | 0.01 | 0.01 | 0.01 | 0.01 | 0.04 | 0.08 | 0.02 | 0.02 | | |
| P | 8 | 8 | 8 | 8 | 8 | 4 | 4 | 8 | 8 | 8 | 8 | 8 | 8 | 8 | 8 |
| T | 160 | 160 | 160 | 140 | 140 | 150 | 150 | 140 | 140 | 140 | 140 | 140 | 140 | 160 | 140 |
| D | 4 | 4 | 2 | 4 | 4 | 4 | 2 | 4 | 4 | 4 | 4 | 4 | 4 | 4 | 4 |
| M | 72 | 68 | 74 | 70 | 73 | 76 | 72 | 70 | 74 | 74 | 75 | 71 | 68 | 87 | 77 |
| C | 65 | 84 | 66.4 | 55 | 33 | 35 | 26 | 36 | 47 | 37 | 32 | 56 | 73 | 29 | 10 |
| H | 84.5 | 87.6 | 86 | 91 | 86 | 91 | 87 | 85 | 92 | 86 | 85 | 91 | 93 | 66 | 64 |
| a | 67.2 | 68.6 | 73.0 | 82.5 | 83.3 | 90.5 | 83.1 | 85.8 | 85.9 | 83.2 | 79.4 | 89.6 | 88.6 | 57.7 | 67.2 |
| b | 21.3 | 20.2 | 18.3 | 7.9 | 7.2 | 3.1 | 8.0 | 5.9 | 5.6 | 8.4 | 11.9 | 0.5 | 1.3 | 27.9 | 15.2 |
| c | 4.3 | 4.7 | 4.1 | 6.3 | 6.4 | 6.4 | 6.4 | 6.3 | 6.1 | 5.6 | 5.3 | 7.0 | 6.3 | 3.9 | 7.8 |
| d | 4.8 | 1.9 | 2.5 | 2.3 | 1.3 | | 1.6 | 1.0 | 0.9 | 1.3 | 2.0 | 0.5 | 0.9 | 4.4 | 5.2 |
| e | 2.4 | 4.6 | 2.1 | 1.0 | 1.8 | | 0.9 | 1.0 | 1.5 | 1.5 | 1.4 | 2.4 | 2.9 | 6.1 | 4.6 |

The procedure in examples 2 to 16 is that described in the first reaction of example 1 but with the starting material and catalyst in the amounts and under the reaction conditions given in table 2. The reaction product obtained has the yield and composition given in table 2.

EXAMPLE 17

A suspension of 0.5 gram atom of potassium and 0.005 mole of nickel acetylacetonate in 600 g. of paraffin oil is placed in an autoclave provided with a stirrer. 6 moles of a n-butylene mixture is forced in and the whole is heated for four hours at 140° C. and then allowed to cool. 3.7 moles of n-butylenes and 1.1 mole of octenes with a small amount of olefins of high boiling point are isolated from the reaction mixture. The conversion of butylenes is 38.3 percent. The $C_8$ fraction contains 35 percent of 3,4-dimethylhexene-1 as the main component.

EXAMPLE 18

The procedure of example 15 is followed but a mixture of 4 moles of propylene and 4 moles of n-butylenes is used instead of the n-butylene mixture. The reaction product has the following composition:

1.6 moles of propylene
2.2 moles of n-butylenes
1.1 moles of hexenes (with 78.6 percent of 4-methylpentene-1)
1.2 moles of heptenes (with 52 percent of 3,4-dimethylpentene-1)
0.5 mole of octenes (with 31 percent of 3,4-dimethylhexene-1).

EXAMPLE 19

One mole per hour of butene-1 is passed at standard pressure and 120° C. through a suspension of 0.5 gram atom of potassium and 0.005 mole of nickel acetylacetonate in 600 g. of paraffin oil. The conversion into $C_8$ olefins is 25 percent.

EXAMPLE 20

(This example is given with reference to the drawing.)

Two moles per hour of propylene (through line 2) and 1 liter per hour of a suspension of 2.5 gram atoms of potassium and 0.03 mole of nickel acetyl acetonate in 400 g. of paraffin oil (through line 3) are supplied to a reactor 1 provided with a stirrer. A temperature of 120° C. is set up in the reactor by means of indirect heating. To maintain a constant pressure of 50 atmospheres, a small proportion of propylene is expanded into a separating column 6 through a valve 5 and line 4. The liquid reaction product passes through line 7 with expansion to atmospheric pressure into a receiver 9 which is also provided with a stirrer. Drainage from the reactor 1 is controlled by a valve 8 so that the reactor 1 always contains 2 liters of the suspension. The hexenes formed and the unreacted propylene are distilled from the paraffin oil suspension in the directly heated receiver 9 over into a separating column 6. The suspension is supplied through a pump 10 and line 3 back to the resistor. 0.6 mole per hour of $C_6$ olefins and 0.005 mole per hour of $C_9$ olefins leaves the column 6 as bottoms product through line 11. The mixture of hexenes has the following composition:

80.8 percent of 4-methylpentene-1
8.0 percent of 4-methylpentene-2
5.6 percent of 2-methylpentene-1
1.3 percent of 2-methylpentene-2
4.3 percent of other $C_6$ olefins.

0.775 mole per hour of unreacted propylene and 0.01 mole per hour of propane leave the top of the column 6 through line 12. The propylene can be returned to the process through line 13.

We claim:
1. In a process for the dimerization of an unsubstituted, linear or branched, α-mono-olefin hydrocarbon having three to eight carbon atoms in the presence of alkali metal catalysts at a temperature of from 60° to 200° C. and at a pressure of from atmospheric pressure to 300 atmospheres, the improvement which comprises dimerizing said olefin or mixtures thereof in the presence of a catalyst consisting essentially of a mixture of an alkali metal and a chelate complex of a β-dicar- bonyl compound and nickel or cobalt in molar ratio of said dicarbonyl compound to said alkali metal in the range of 0.001:1 to 0.5:1.

2. A process as claimed in claim 1 in which the alkali metal used is potassium.

3. A process as claimed in claim 2 wherein said mono-olefin hydrocarbon is propylene and the produced dimers are 4-methylpentene-1 and other methyl pentene isomers thereof.

4. A process as claimed in claim 1 wherein the dimerization is carried out in the presence of an inert organic solvent.

5. A process as claimed in claim 1 wherein the dimerization is carried out in the presence of a saturated aliphatic hydrocarbon as solvent.

6. A process as claimed in claim 1 carried out at a temperature of from 100° to 150° C.

7. A process as claimed in claim 1 carried out at a pressure of from 30 to 80 atmospheres.

8. A process as claimed in claim 1 wherein said chelate complex is nickel(II) acetylacetonate, cobalt(III) acetylacetonate, or nickel(III) benzoyl acetonate.

9. A process as claimed in claim 8 wherein said mono-olefin hydrocarbon is propylene and the produced dimers are 4-methylpentene-1 and other methyl pentene isomers thereof.

* * * * *